JOHN L. ARNOLD.
Safety-Driving Apparatus.
No. 127,403.    Fig. 1.    Patented June 4, 1872.
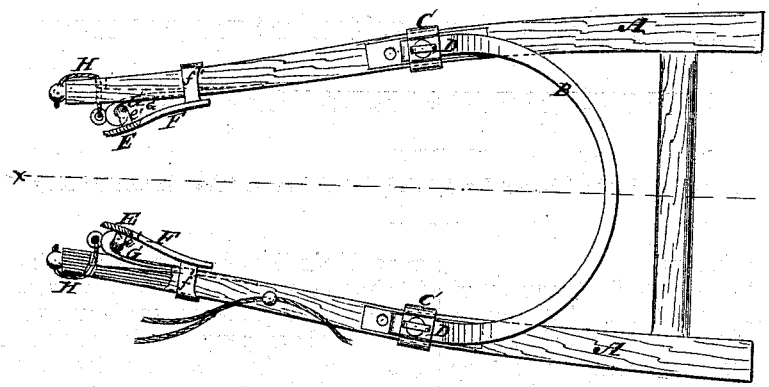
Fig. 2.
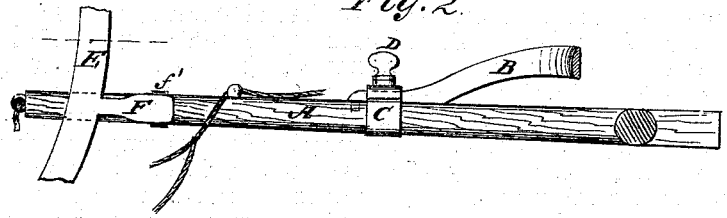
Fig. 3.
Fig. 4.    Fig. 5.    Fig. 6.
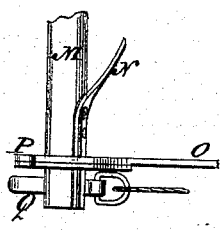 
Fig. 7.
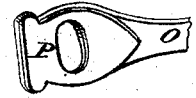
Fig. 8.
Witnesses:            Inventor:
E. Wolff            John L. Arnold
Francis McArdle    per Munn & Co
                   Attorneys.
AM. PHOTO-LITHOGRAPHIC CO. N.Y. (OSBORNE'S PROCESS.)

UNITED STATES PATENT OFFICE.

JOHN L. ARNOLD, OF LOWNDESVILLE, SOUTH CAROLINA.

IMPROVEMENT IN SAFETY-HARNESS.

Specification forming part of Letters Patent No. 127,403, dated June 4, 1872; antedated May 15, 1872.

*To all whom it may concern:*

Be it known that I, JOHN L. ARNOLD, of Lowndesville, in the county of Abbeville and State of South Carolina, have invented a new and useful Improvement in Safety Driving Apparatus; and I do hereby declare that the following is a full, clear, and exact description thereof, which will enable others skilled in the art to make and use the same, reference being had to the accompanying drawing forming a part of this specification, in which—

Figure 1 is a top view of a pair of shafts to which my improved apparatus has been applied. Fig. 2 is a detail sectional view of the same taken through the line $x\,x$, Fig. 1. Fig. 3 is a detail view of the hame-fastener. Fig. 4 is a view illustrating the manner in which the reins are connected with the ends of the bit. Figs. 5, 6, 7, 8 are detail views of the parts shown together in Fig. 4.

Similar letters of reference indicate corresponding parts.

My invention has for its object to furnish an improved apparatus for connecting a horse to the shafts and driving him, which shall be so constructed that the driver can instantly detach the horse when required and allow him to go free and naked, and which shall be simple in construction, light and easy for the horse, and will remove the necessity for the complicated harness now required; and it consists in the construction and combination of the various parts of the apparatus, as hereinafter more fully described.

A represents a pair of shafts. B is the hold-back bar, which I prefer to make of spring steel, and which is bent or curved and inclined upward to fit upon the hips of the horse, and be in proper position for him to rest against in backing or holding back the carriage. The ends of the hold-back bar B rest and fit upon the shafts A, and have hooks or points formed upon them to enter holes in the shafts A or in metallic plates let into and secured to said shafts. The hold-back bar B is so arranged that it may be raised and lowered to adjust it to high and low horses. The elasticity of the bar B also enables it to spring down should the horse in backing step into a low place in the ground and again rise so as to be always in proper position. C are metallic bands so formed as to be slipped upon the ends of the curved bar B and securely connect them with the shafts A. The bands C are secured, when adjusted, in place by hand-screws D passing through the upper part of the bands C through the ends of the bar B and into the shafts A. Several holes are formed in the shafts A to allow the hold-back bar to be adjusted as the length of the horse may require. E are the hames, which have short rearwardly-projecting arms F formed upon them, upon the outer sides of the rear ends of which are formed rings or bands $f'$, through which the forward ends of the shafts A are passed. In the inner sides of the forward ends of the shafts A are formed grooves or recesses, in which are secured spring-bars G having hooks formed upon their forward ends to catch upon eyes or loops $e'$ formed upon the outer sides of the hames E to sustain the draft. For convenience in connecting the hames E with and removing them from the shafts A small cords H are attached to the forward ends of the spring-hooks G, which pass through the said shafts, and the free ends of which are hooked upon knobs attached to the forward ends of the shafts A. I is a metallic strap bent together at its center to form an eye to receive the hame-ring, and which is so formed that when left free its ends may tend to spring from each other. To one arm of the strap I are attached the ends of a series of staples, J, which project through a series of cross-slots formed in the other arm of the strap I. K is a bent metallic strap exactly like the strap I, except that it has cross-slots formed through both arms to receive the staples J. L is the key, which is also made of a strip of elastic metal bent at its center, so that its ends may be passed through the staples J, and which is retained in place by its own elasticity. By this construction as soon as the spring-key L is withdrawn the elasticity of the straps I K at once withdraws the staples J from the strap K, disconnecting the fastening. M is the bit, which is prevented from slipping over the horse's tusks while driving by the chin-strap N, which should be buckled around the horse's jaw, and the ends of which are metal-tipped and rounded upon their outer sides, leaving their inner sides flat to fit upon the flattened rear side of the end of the bit. To the end of the reins O is attached a small metallic plate, P, having a hole formed through it to receive the ends of the bit and chin-strap, where it is secured in place by a spring-key, Q. To the key Q should be attached one end of a branched cord, another end of which is attached to the spring-key L of the hame-fastener. The cord then should pass back through guide-rings attached to the shaft A, and should be connected with the dash-board of the carriage in such a position that it may be easily grasped by the driver when required. By this construction by pulling upon the said cord the keys L Q will be withdrawn and the horse allowed to go free, leaving the entire apparatus behind him. The branches of the detaching-cord should be so adjusted in length that the key L may be first withdrawn, and as the horse escapes from the shafts, the key Q may be withdrawn, allowing him to go entirely stripped, and leaving the entire apparatus still connected with the shafts, so that the entire apparatus and the shafts may be held up by the driver until such time as he wishes to lower them to the ground.

Having thus described my invention, what I claim as new, and desire to secure by Letters Patent, is—

1. The arm F, band $f'$, and spring-hook G, for connecting the hames to the forward ends of the shafts A, substantially as herein shown and described, and for the purpose set forth.

2. The hame-fastener I J K L, constructed and operating substantially as herein shown and described, and for the purpose set forth.

3. The bit M, metal-tipped chin-strap N, perforated plate P, and spring-key Q, constructed substantially as herein shown and described, for detachably connecting the bit and reins with each other and with the horse's mouth, substantially as and for the purpose set forth.

JOHN L. ARNOLD.

Witnesses:
E. WHITE,
L. T. ARNOLD,